(No Model.)

H. W. HOOPS, Jr.
FUNNEL.

No. 435,096. Patented Aug. 26, 1890.

WITNESSES
Jno G. Henkel
Georgia P. Kramer.

INVENTOR
Henry W. Hoops Jr.
by Foster Freeman
Attorneys

UNITED STATES PATENT OFFICE.

HENRY W. HOOPS, JR., OF BROOKLYN, NEW YORK.

FUNNEL.

SPECIFICATION forming part of Letters Patent No. 435,096, dated August 26, 1890.

Application filed June 6, 1890. Serial No. 354,434. (No model.)

*To all whom it may concern:*

Be it known that I, HENRY W. HOOPS, Jr., a citizen of the United States, residing at Brooklyn, Kings county, New York, have invented certain new and useful Improvements in Funnels, of which the following is a specification.

My invention relates to funnels or similar articles used in clarifying, purifying, decanting, or filtering fluid or semi-fluid materials; and it has for its object to improve the construction of such devices, so that the various processes may be carried on more quickly and perfectly; and to these ends my invention consists in a funnel having the characteristics hereinafter specified.

Figure 1:
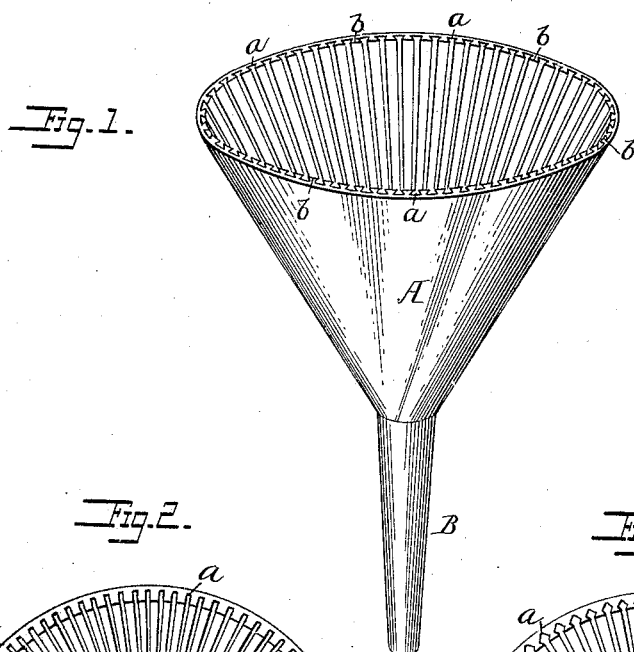
Figure 2:
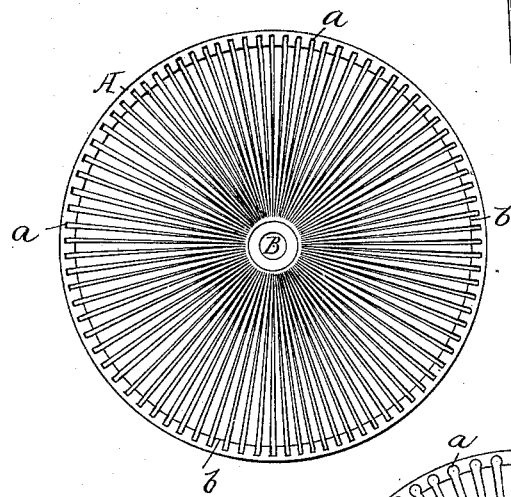
Figure 3:
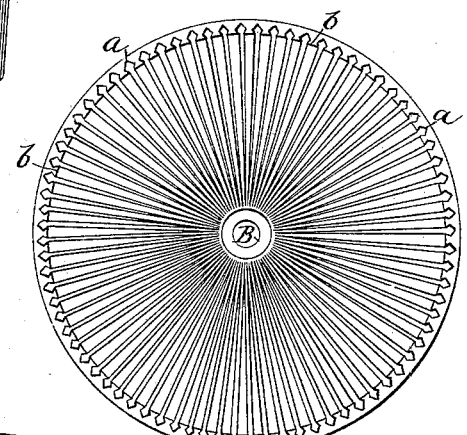
Figure 4:
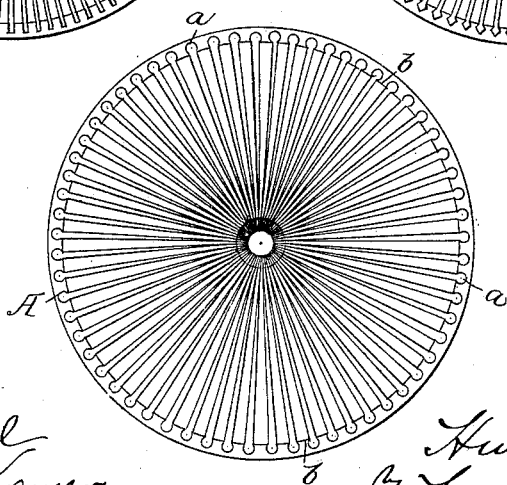

In the drawings, Figure 1 is a perspective view of a funnel embodying my invention; and Figs. 2, 3, and 4 are plan views showing various modifications of the same general features of construction.

In carrying out the process of clarification, purification, decantation, or filtration by the use of funnels or similar articles it is common to insert into the funnels some filtering medium—such as filtering-paper, glass, wool, fabrics of various kinds, skins, sponge, &c.—and to place the material to be treated inside of said filtering medium, and to allow it to pass or percolate through the medium and thence pass down through the sides of the funnel to the spout or nozzle, which may be placed at any point where it is desired to deliver the purified material. It is well known that many of these materials fit closely the inside of the funnel, especially as soon as they become saturated with the material being treated, and as they adhere to a greater or less extent to the insides of the funnel the process is retarded, as the material which is passed through the filtering medium cannot properly pass away and be delivered to the proper receptacle. Various means have been proposed to overcome this objection, and, among other things, funnels have been made having peculiarities of construction which are alleged to accomplish these results. One of the most common expedients resorted to is to make the funnel corrugated or fluted on its inner side. Others have provided projections extending inward from the inside of the funnel, and it has also been proposed to put in the funnel a skeleton frame which would support the filtering medium. Without attempting to set forth all the expedients heretofore tried, it may be said that, while they accomplish the results desired to a greater or less extent, they have some disadvantages which it is the object of my present invention to overcome.

In carrying out my invention I make use of a funnel, which may be of any desired shape or configuration and of any material suitable or proper for such purposes, and in the drawings I have illustrated one form having a body or bell A and a spout B. These parts of the funnel are preferably made with the outsides smooth, while the inside of the bell, and in some instances of the spout, is provided with a series of channels $a$, formed in the material and radiating from the central or contracted end of the funnel. These channels are separated by portions or ribs $b$, formed integral with the funnel and tapering toward the central or contracted portion. These channels may be of various shapes, some of which I have illustrated in the accompanying drawings, the essential feature being that the ribs separating the channels shall be wider on their inner surfaces than the greatest width of the channels at the surfaces of the ribs. Thus in Fig. 1 I have shown the channels in the form of a dovetail groove, the ribs being wider at their inner faces than at the bottom of the grooves. In Fig. 2 I have shown the channels as having parallel sides, but in each instance the width of the channels is less than the width of the inner surface of the ribs. In Fig. 3 the grooves are shown as four-sided, and the ribs are undercut, but the surfaces of the ribs are wider than the opening of the channels on a plane with the surface of the ribs. In Fig. 4 the channels consist of circular grooves. From these illustrations it will be seen that the channels may be made in various forms without departing from the principle of my invention, the essential feature of which is that the separating-ribs between the channels shall have a surface of greater width than the width of the channels at the inner surface of the funnel. The advantages of this construction will be apparent in that the filtering medium of paper fabric or other material, when placed in the funnel in the usual way, will find a sufficient bearing-surface to support it and prevent its being pressed into the channels by the pressure of the fluid being treated, and will thus provide open and free channels for the passage of the purified material to the spout B, so that the fluid will readily pass from the spout and be delivered to the proper receptacle without in any way interfering with the filtering or other process. These channels, as will be seen, all radiate from the center and furnish the shortest passage from any given point on the inside of the funnel to the spout, and it will further be seen that in the lower portions of the bell, where the pressure of the fluid is greater, the width of the channels at their mouths is less, and consequently the tendency of the filtering medium to be forced into the channels is fully overcome. The spout itself may be provided with similar channels, or not, as preferred, as there is little danger of interference with the passage of the purified material after it has reached the bottom of the bell.

Having thus described my invention, what I claim is—

1. A funnel the bell of which is provided with ribs and intervening channels, said ribs being undercut, substantially as described.

2. A funnel the bell of which is provided with channels the intervening ribs of which have a greater surface than the opening of the channels on the plane of the ribs, the channels being enlarged beneath the plane of the ribs, substantially as described.

In testimony whereof I have signed my name to this specification in the presence of two subscribing witnesses.

HENRY W. HOOPS, Jr.

Witnesses:
A. W. KIDDLE,
L. F. GOLDMANN.